No. 702,976. Patented June 24, 1902.
E. W. LYMBURNER.
BICYCLE.
(Application filed Sept. 25, 1901.)
(No Model.)

Witnesses
L. E. George
C. E. Herald

Inventor
Eli W. Lymburner
By John H. Hendry
Atty.

THE NORRIS PETERS CO., PHOTO-LITHO., WASHINGTON, D. C.

UNITED STATES PATENT OFFICE.

ELI W. LYMBURNER, OF WARNER, CANADA.

BICYCLE.

SPECIFICATION forming part of Letters Patent No. 702,976, dated June 24, 1902.

Application filed September 25, 1901. Serial No. 76,441. (No model.)

*To all whom it may concern:*

Be it known that I, ELI W. LYMBURNER, a citizen of Canada, residing at Warner, in the county of Wentworth and Province of Ontario, Canada, have invented certain new and useful Improvements in Bicycles; and I do hereby declare the following to be a full, clear, and exact description of the invention, such as will enable others skilled in the art to which it appertains to make and use the same.

My invention relates to improvements in bicycles in which the seat-post tube and the seat-post of a bicycle are utilized as an air-pump to pump air into the pneumatic tire of a bicycle-wheel by means of a flexible tube connected to the lower part of the pump and to the tire of a wheel.

The object of my invention is to provide an air-pump as a component part of a bicycle for the inflation of a wheel-tire with air. I attain this object by the mechanism illustrated in the accompanying drawings, in which—

Figure 1:
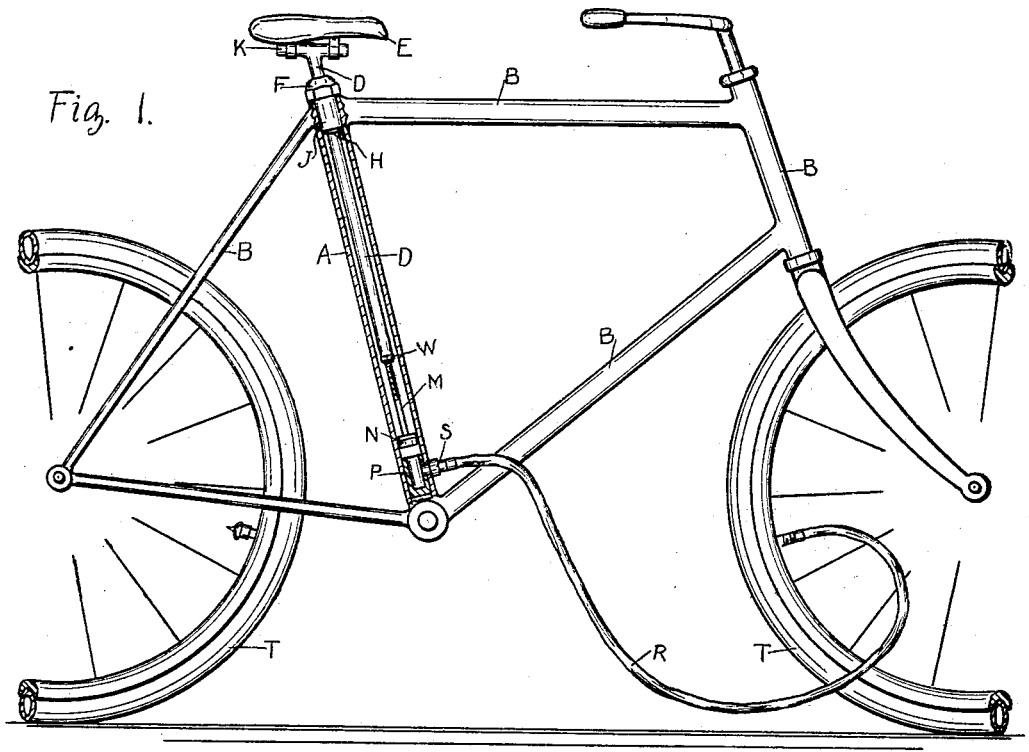
Figure 2:
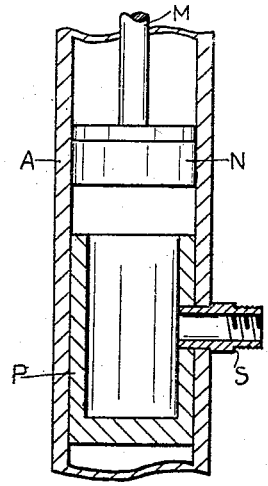
Figure 3:
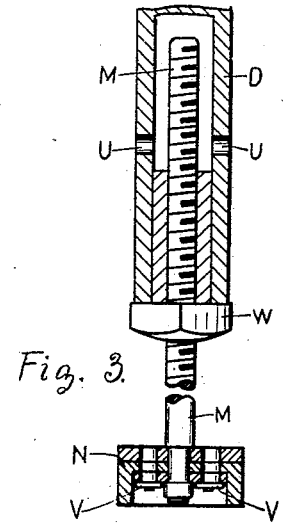
Figure 4:
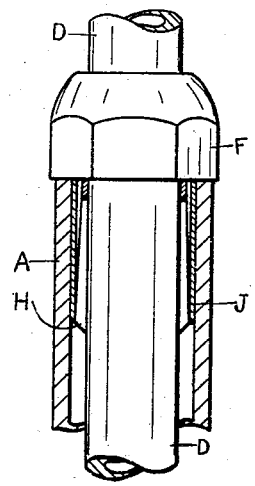
Figure 5:
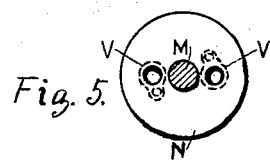

Figure 1 is a side elevation of a bicycle, showing the seat-post tube in section, the seat-post inside of said tube, the piston-rod as a part of said post, the stationary plug at the lower end of the tube, and the flexible tube connected to a valve of said plug and to the valve of the tire. Fig. 2 is an enlarged sectional side elevation of the lower part of the seat-post tube with piston and plug. Fig. 3 is an enlarged sectional elevation of the lower end of the seat-post with the adjustable piston-rod broken. Fig. 4 is an enlarged elevation of the upper part of the seat-post tube, showing how the seat-post is secured to the seat-post tube. Fig. 5 is a plan of the piston, showing the valves in broken lines.

Similar letters refer to similar parts throughout the several views.

In the drawings the seat-post tube of a bicycle is indicated by A, the other parts of the bicycle-frame in general by B, the seat-post by D, and the seat by E. The upper part of the hollow seat-post D, which is also a tube, is secured to the upper end of the seat-post tube A by means of the nut F, which when screwed onto the tapered split ring H the said ring H tightens against the outer split ring J of the tube A and fastens the seat-post D to the seat-post tube A. This manner of fastening the seat-post to the seat-post tube is not new.

The upper end of the seat-post has a hollow cross-head K, to which is attached the seat E in the usual manner. The seat-post D fits loosely in the tube A, and the lower end of the post D has an adjustable extending piston-rod M, provided with a piston N, which fits snugly in the tube A. The piston-rod M is screwed into the lower end of the post D and is held and allowed to be adjusted by means of the nut W. The piston-rod and piston, together with the hollow post D, are shown in their lowermost position, and it will be perceived that there is space between the piston and the upper end of the stationary hollow plug P when the piston is in lowered position. The hollow plug P is intended to be used only in bicycles already constructed and is for the purpose of stopping any possible opening at the bottom of the tube A and to afford greater thickness to that part of the tube A to which the valve connection S of the flexible tube R connects. One end of the flexible tube R is connected to the plug P by means of a valve connection S. The other end of the flexible tube R is connected in the usual manner to the tire T of a wheel. The plug P receives air when the pump is operated. Air is supplied to the pump very fully through the hollow cross-head K, the air passing downward in the hollow post D and thence into the tube A by means of apertures U in the lower part of the post D, and seen in Fig. 3 of the drawings.

V represents valves in the lower recessed part of the piston N. When the piston ascends, the piston-valves open, and when the piston descends the piston-valves close, as shown.

When operating the pump to inflate the tire, the nut F is partially unscrewed, so as to allow the post D to ascend and descend through the relaxing ring H and nut F. The post D is operated by means of the seat E, or the said seat may be removed, and the cross-head K may be used as a handle to operate the post D, together with the piston N, to force air through the flexible tube R and into the tire T.

Various changes in the form, proportion, and minor details of this invention may be resorted to without departing from the spirit and scope thereof. Hence

What I claim as my invention, and desire to secure by Letters Patent, is—

In a bicycle, a seat-post tube open at its upper end, a hollow seat-post extending in said tube and adjustably secured to the upper end of the tube, a piston, an adjustable rod connecting the piston with the post, air-apertures in the lower end of the post and a flexible tube connected to the lower end of said seat-post tube and to a wheel-tire to inflate said tire with air, substantially as set forth.

In testimony whereof I affix my signature in presence of two witnesses.

ELI W. LYMBURNER.

Witnesses:
 JOHN H. HENDRY,
 B. E. HERALD.